May 23, 1967
M. SKLAROFF
3,321,686
STEPPING MOTOR CONTROL CIRCUIT UTILIZING
A FLIP-FLOP WITH A DELAYED FLOP
Filed May 22, 1964
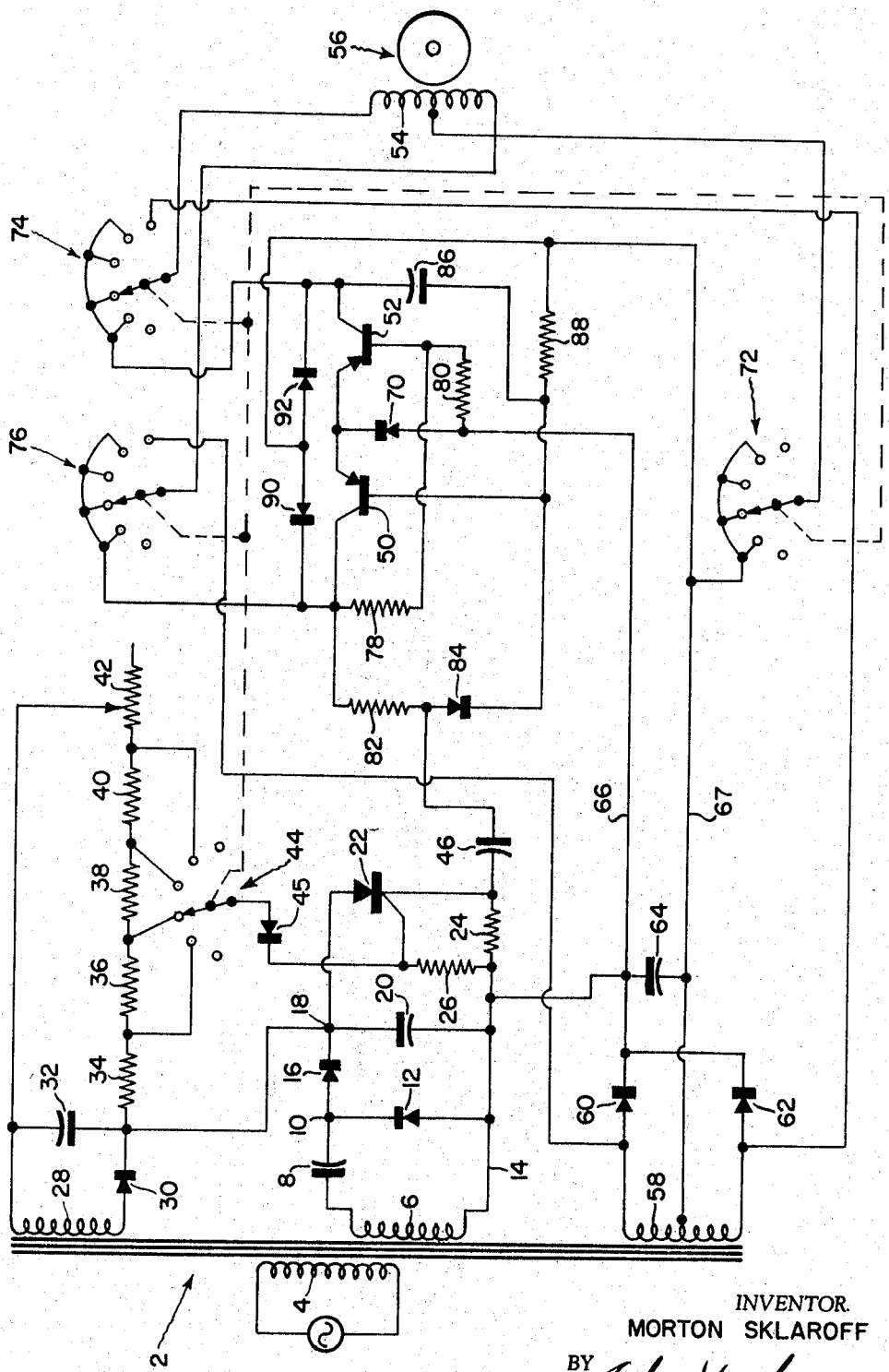
INVENTOR.
MORTON SKLAROFF
BY Arthur H. Seidman
ATTORNEY.

United States Patent Office 3,321,686
Patented May 23, 1967

3,321,686
STEPPING MOTOR CONTROL CIRCUIT UTILIZING A FLIP-FLOP WITH A DELAYED FLOP
Morton Sklaroff, Philadelphia, Pa., assignor to Honeywell Inc., Minneapolis, Minn., a corporation of Delaware
Filed May 22, 1964, Ser. No. 369,450
4 Claims. (Cl. 318—138)

This invention relates to electrical apparatus, and more particularly to an electronic circuit for controlling the speed of an electric motor.

There are numerous instances when it is desirable to be able to drive a piece of apparatus at any one of a plurality of predetermined speeds. One such instance is in the case of the drive means for the strip chart of a recorder such as used in recording prevalent conditions in connection with industrial processes. Heretofore, selectivity in chart drive speed has been obtained through the use of fixed speed motors and interchangeable gear trains. On the other hand, some rather complex systems have been devised using elaborate variable frequency oscillators and motors driven thereby.

In a copending application of William D. Macgeorge filed July 15, 1963, and bearing Ser. No. 295,163, there has been disclosed an improved electronic circuit for selectively driving a motor at any one of a plurality of predetermined speeds. The present invention is an improvement over that disclosed in that copending application.

It is an object of the present invention to provide an improved system for selectively driving a motor at any one of a plurality of predetermined speeds and which features an improved motor control circuit.

It is a further object of this invention to provide an improved motor driving system, as set forth, wherein said system is all electrical, which accomplishes the speed selection without necessitating any change of gear ratios, and features simplicity in organization and operation.

Another object of the present invention is to provide an improved control circuit featuring a monostable flip-flop with a delayed flop.

In accomplishing these and other objects, there has been provided, in accordance with the present invention, an electrical circuit for the selective energization of a drive motor to cause said motor to be operated at any one of a plurality of predetermined speeds. Line-frequency signals, drawn from the power lines, constitutes a basic reference signal. A capacitive storage circuit is charged by pulses from the line. A triggered gate means is provided which constitutes a discharge path for the storage circuit whenever the stored signal exceeds an adjustable predetermined value, each adjustment being representative of a selected speed. Means are provided which are responsive to the discharge of said storage circuit through said gate means to produce, effectively, a series of pulses having a positive and negative peak, the pulses corresponding in frequency to the frequency of the discharge through said gate. These pulses will, accordingly, be of a frequency which is an integral submultiple of the line frequency and will be as stable as the line frequency. The pulses produced as a result of the discharge of the storage circuit through the gate are too short in duration to be applied directly to drive the motor. The means responsive to the discharge of the storage means includes a motor control circuit which includes a monostable circuit with a delayed return whereby to effectively stretch the pulses to a useful duration. The pulses thus produced applied to a simple, multipoled motor which is characterized in that it will advance by one pole for each pulse having a positive and negative peak.

A better understanding of this invention may be had from the following detailed description when read in connection with the accompanying drawing, in which:

The single figure is a schematic diagram of a circuit embodying the present invention.

Referring now to the drawing in more detail, there is shown a power transformer 2 having a primary winding 4 connected to the power lines. A first secondary winding 6 is connected, first, to a storage circuit and, then, to a gate means. The storage circuit includes a first capacitor 8 serially connected between one terminal of the secondary winding 6 and a first junction point 10. An asymmetrically conducting diode 12 is connected between a lead 14 from the other terminal of the secondary winding 6 and the junction point 10. A second asymmetrically conducting diode 16 is connected serially between the first junction 10 and a second junction 18. Between the second junction 18 and the lead 14, there is connected a second capacitor 20.

The triggered gate means include a silicon controlled rectifier 22 having its anode connected to the second junction 18 and its cathode connected, through a resistor 24, to the lead 14. The control electrode of the silicon controlled rectifier is connected, through a resistor 26, to the lead 14. A source of bias signal is also connected to the control electrode of the silicon controlled rectifier 22.

The source of bias signal includes a second secondary winding 28 on the transformer 2. A diode rectifier 30 and a filter capacitor 32 constitute a half-wave rectifier for the signal developed across the winding 28 to provide a D.C. signal across the capacitor 32. A plurality of serially connected resistors 34, 36, 38, 40 and 42 are connected across the capacitor 32. The junction between the diode 30, the capacitor 32, and the first resistor 34 is connected to the junction 18, therefore to the anode of the silicon controlled rectifier 22. A selector switch 44 is provided which includes a plurality of fixed contacts and a movable contact. The movable contact of the switch 44 is connected to the anode of diode 45. The cathode of diode 45 is connected to the control electrode of the silicon controlled rectifier 22. While five resistors are shown in the bias supply circuit, it will be apparent that a greater or smaller number of such resistors may be used to provide more or fewer possible speed selections. The five illustrated resistors provide a choice of four peeds. The selector switch includes one fixed contact position for each of the four speed choices, plus one fixed contact position representing an "off" position, plus one additional contact position representing line-frequency direct drive, as will be more fully set forth hereinafter. Thus, the left hand contact position of the switch 44 is an open contact and represents the "off" position; the second contact is connected to the junction between the resistors 34 and 36; the third contact is connected to the junction between the resistors 36 and 38; the fourth contact is connected to the junction between the resistors 38 and 40; the fifth contact is connected to the junction between the resistors 40 and 42; and the sixth contact is an open contact. When the movable contact of the switch 44 engages one of the four fixed contacts connected to the bias circuit, a predetermined bias signal is applied to the control electrode of the silicon controlled rectifier 22, thereby to control the triggering condition thereof.

Whenever the silicon controlled rectifier is triggered to a conductive state, the capacitor 20 is discharged therethrough. The discharge of the capacitor 20 through the rectifier 22 produces a voltage signal across the resistor 24. That signal is a sharp pulse signal which is too narrow to be used as an ultimate control signal.

Accordingly, the output of the gate means is connected, through a coupling capacitor 46, to a control circuit which includes means for effectively stretching the pulse to a useful pulse-length.

The control circuit includes a first and a second transistor 50 and 52 which are interposed between a power source and the field winding 54 of a motor 56. The motor is of the type having a multiplicity of poles and which is characterized in that when a pulse having a positive and then a negative peak is applied to the winding, the rotor of the motor will be angularly advanced by an amount substantially equal to the angular spacing between adjacent poles. The power supply for the control circuit includes a third secondary winding 58 on the power transformer 2. A full-wave rectifier, including a pair of diodes 60 and 62, and a filter capacitor 64, is connected to the secondary winding 58, to produce a D.C. power source. The positive lead 66 from the power source is connected to the lower or reference lead 14 of the trigger circuit. The positive lead 66 is connected, through a bias diode 70 to the conjoined emitters of the two transistors 50 and 52 of the control circuit. The negative lead 67 of the power source is connected, through a switch 72, to the center tap on the motor winding 54. One end terminal of the motor winding 54 is connected, through a switch 74, to the collector electrode of the transistor 52. The other end terminal of the motor winding 54 is connected, through a switch 76, to the collector electrode of the transistor 50. The collector electrode of the transistor 50 is also connected, through a resistor 78, to the base electrode of the transistor 52. The base electrode of the transistor 52 is also connected, through a resistor 80, to the positive lead 66. The collector of the transistor 50 is connected, through a serially connected resistor 82 and a diode 84, to the base electrode thereof. The trigger circuit is connected, through the coupling capacitor 46, to the junction between the resistor 82 and the diode 84. The collector of the transistor 52 is also connected, though a capacitor 86 to the base of the transistor 50. The base electrode of the transistor 50 is further connected, through a resistor 88, to the negative lead 67 of the power supply. A diode 90 is effectively connected in shunt with a first half of the motor winding 54 while a second diode 92 is effectively connected in shunt with the other half of the motor winding 54.

The three switches 72, 74, and 76 are identical and ganged for operation with the selector switch 44. As in the selector switch 44, the first contact position on each of the three switches 72, 74, and 76 is an open contact, representative of the "off" position. The second, third, fourth and fifth contacts on each of the three switches 72, 74, and 76, are connected together, respectively. In these positions, corresponding to the four bias selecting positions of the switch 44, the motor winding 54 is connected to the power supply source through the transistors 50 and 52 of the control circuit. The sixth contact position of the switch 44 is an open contact, no bias being applied to the gate circuit at that position. The sixth contact of the two switches 74 and 76, respectively, are connected directly to the A.C. terminals of the power source transformer 58, ahead of the rectifiers. In the switch positions two through five, the speed of the motor 56 is controlled by the pulsations developed through the triggered gate and the control circuit. In the sixth switch position, the motor is energized directly from the line-frequency. Since each of the speeds effected through the control circuit results from pulsations at some integral submultiple of the line-frequency, the direct energization of the motor at the line-frequency, as in the sixth position of the switches, provides one additional speed which may be selected.

In operation, the alternating signals developed across secondary winding 6 produce charging of the capacitor 8 through the diode 12 on one half cycle of the energizing alternating signals. On the next or opposite half cycle, the energizing signal plus a portion of the charge stored on the capacitor 8 is applied as a charging signal to the larger capacitor 20 through the diode 16. The charge on the capacitor 20 continues to build up until it is discharged through the silicon controlled rectifier 22. Since the charge build up on the capacitor 20 is in increments at the line-frequency rate, it is apparent that the discharge rate or pulse rate output from the gate means will be an integral submultiple of the line-frequency. The discharge of the capacitor 20 through the silicon controlled rectifier 22 is controlled by the bias signal applied to the control electrode of the rectifier 22.

The bias circuit, including the series string resistors 34 to 42 and the selector switch 44, provides means for selecting a number of different bias values to be applied to the control electrode of the silicon controlled rectifier. In one circuit constructed in accordance with the present invention, the bias values were chosen that, based on a line-frequency of 60 cycles per second, the pulse repetition rate from the gate means were 30, 12, 6 and 3 per second with the selector switch in positions two through five, respectively.

The output from the gate means is a sharp narrow positive-going spike. With the switches 44 and 72 through 76 in any of the positions two through five, the negative side of the motor control power source is connected to the collector electrodes of both transistors 50 and 52. The resistors 78 and 80 provide a bias circuit for the base electrode of the transistor 52, normally biasing the transisstor 50 into maximum conduction through the lower half (as illustrated) of the motor winding 54. The positive pulse from the trigger circuit through the capacitor 46, is applied to the base electrode of the transistor 50 through the diode 84 causing that transistor 50 to tend toward non-conduction or cut-off. While the transistor 50 is fully conductive, the voltage drop across the emitter-collector path thereof is minimal to the point of insignificance. Accordingly, the potential at the collector of the transistor 50 is substantially that of the positive supply lead 66. That results is the application of a positive bias on the base of the transistor 52, keeping that transistor at cut-off. With the transistor 52 at cut-off, the potential at the collector thereof is substantially that of the negative supply lead 67. Under these conditions, the capacitor 86 is charged with a negative potential on the electrode adjacent the collector of the transistor 52.

When the positive pulse from the trigger circuit is applied to the base of the transistor 50, the decreased conductivity of that transistor 50 causes the potential at the collector thereof to start moving toward a negative value. The negative going signal appearing at the collector of the transistor 50 is applied, through the resistor 78, to the base of the transistor 52, starting that transistor into conduction through the upper half of the motor winding 54. The conduction of the transistor 52, causes the potential at the collector thereof to become more positive. This, in turn, causes a change in the charge characteristic of the capacitor 86. That change in the charge on the capacitor 86 is reflected as a positive going potential on the base of the transistor 50, further tending to cut-off the conductivity of that transistor. In practice, this regenerative effect takes place substantially instantaneously, causing the condition of the transistor 50 to be substantially instantaneously changed from full "on" to full "off," and the condition of the transistor 52 changed from full "off" to full "on." That changed condition is sustained until the capacitor 86 has discharged through the resistor 88 sufficiently to allow the transistor 50 to return to conduction. As the transistor 50 returns to conduction, the transistor 52 is rendered non-conductive, and again, the transfer is substantially instantaneous.

The discharge time-constant of the circuit of the capacitor 86 is sufficiently long as to allow the motor 56 to respond to that portion of the pulse signal, for example, sixteen milliseconds. Thus, the control circuits is, generally, in the form of a flip-flop with a delayed flop. With the conductivity of the transistors 50 and 52 being terminated abruptly during each cycle, the inductance of the two halves of the motor winding 54, respectively, would tend to produce a back E.M.F. which might be of sufficient magnitude to damage the corresponding control transistor. To obviate such an occurrence, the protective diodes 90 and 92 are connected in shunt, respectively, with the two halves of the motor winding 54 and poled to provide a short-circuit path for the back E.M.F. Since the signals from the D.C. power source are alternately applied to the two halves of the motor winding, the resultant is as if a positive and a negative pulse were applied to the motor winding. This, as hereinbefore mentioned causes the rotor to be angularly advanced by an amount equal to the angular spacing between adjacent poles of the motor. For example, in a motor having 24 poles, the rotor would be advanced 15° for each pulse transmitted by trigger circuit. Thus the speed of the motor is controlled by the repetition rate of the produced pulses which, in turn, is controlled electrically by selecting from a choice of predetermined values for a bias signal to be applied to the pulse producing circuit. One additional feature which should be noted is that the system is relatively free from inaccuracies as a result of variations in the line voltage. The charging voltage for the storage circuit and the bias voltage for the gate circuit are both derived from the same line source, therefore, a change in one, as a result of line voltage changes, will be offset by a corresponding change in the other.

Thus there has been provided a variable speed motor control circuit wherein speed selection and control is accomplished electrically, which is simple in construction and operation, and which is as stable as the line frequency from which the control is derived.

What is claimed is:

1. A motor control system comprising a pulse generator including a capacitive storage circuit means and a bias-controlled gate circuit means connected to said storage circuit means for periodically discharging said storage circuit means at a repetition rate determined by the magnitude of a bias signal applied to said gate circuit means, a bias selection circuit including a resistance string for producing a plurality of bias voltage signals and a selector switch means connected between said resistance string and said gate circuit means for applying a selected one of said plurality of bias signals to said gate circuit means, a stepping motor having a field winding, said motor being responsive to a pulse having a positive and negative peak for advancing a single increment, and control circuit means connected between said gate circuit means and said motor winding, said control circuit means including a transistor flip-flop circuit with a delayed flop and being responsive to pulses from said gate circuit means to effectively apply a series of pulses having positive and negative peaks to said motor winding.

2. A motor control system comprising a pulse generator including a capacitive storage circuit means and a bias-controlled gate circuit means connected to said storage circuit means for periodically discharging said storage circuit means at a repetition rate determined by the magnitude of a bias signal applied to said gate circuit means, a bias selection circuit including a resistance string for producing a plurality of bias voltage signals and a selector switch means connected between said resistance string and said gate circuit means for applying a selected one of said plurality of bias signals to said gate circuit means, a stepping motor having a center-tapped field winding, and said motor being responsive to a pulse effectively having a positive and negative peak for advancing through a single increment, and control circuit means connected between said gate circuit means and said motor winding, said control circuit means including a transistor monostable flip-flop with a delayed flop and being responsive to pulses from said gate circuit means to effectively apply a series of pulses having positive and negative peaks to said motor winding, said flip-flop including a power supply means, a first transistor having its emitter-collector path connected in series between said power supply means and a first half of said center-tapped motor winding, a second transistor having its emitter-collector path connected in series with the other half of said motor winding, biasing means rendering said first transistor normally conductive, means connecting said gating circuit to the base electrode of said first transistor whereby to cut-off the conduction of said first transistor in response to pulse signals from said gate circuit, coupling means between the collector of said first transistor and the base electrode of said second transistor to render said second transistor conductive coincident with the cut-off of said first transistor, and time delay means coupled between the collector of said second transistor and said base of said first transistor whereby to delay the restoration of conductivity of said first transistor after the occurrence of a pulse from said gate circuit means.

3. The invention as set forth in claim 2 wherein said time delay means comprise a capacitance-resistance delay circuit.

4. The invention as set forth in claim 2 and characterized by the addition of a first asymmetrically conduction diode connected in shunt with one half of said center-tapped motor winding and a second asymmetrically conductive diode connected in shunt with the other half of said motor winding whereby to provide short-circuit paths for back E.M.F. signals developed in said motor winding.

References Cited by the Examiner

UNITED STATES PATENTS 2,949,548   8/1960   Wiseman _____ 331—113

ORIS L. RADER, *Primary Examiner.*

G. FRIEDBERG, G. Z. RUBINSON,

*Assistant Examiners.*